US006445808B1

(12) United States Patent
Lile et al.

(10) Patent No.: US 6,445,808 B1
(45) Date of Patent: Sep. 3, 2002

(54) METHOD AND APPARATUS FOR DETECTING CREDIT/DEBIT CARDS IN CONNECTION WITH THE PROCESSING OF BULK MAIL

(75) Inventors: William R. Lile; Mark A. Stevens, both of Medford; George L. Hayduchok, Mt. Holly, all of NJ (US)

(73) Assignee: Opex Corporation, Moorsetown, NJ (US)

( * ) Notice: Subject to any disclaimer, the term of this patent is extended or adjusted under 35 U.S.C. 154(b) by 1182 days.

(21) Appl. No.: 08/663,020

(22) Filed: Jun. 7, 1996

Related U.S. Application Data

(63) Continuation of application No. 08/342,635, filed on Nov. 21, 1994, now abandoned, which is a continuation-in-part of application No. 07/853,411, filed on Mar. 13, 1992, now abandoned.

(51) Int. Cl.[7] ............................ G06K 9/00; B07C 5/02

(52) U.S. Cl. ........................ 382/101; 209/3.1; 209/539; 209/567; 250/223 R

(58) Field of Search ................................ 382/101, 102; 53/396; 250/223 R; 209/3.1, 539, 540, 567

(56) References Cited

U.S. PATENT DOCUMENTS 4,863,037 A 9/1989 Stevens et al. .............. 209/3.1
5,115,918 A * 5/1992 DeWitt et al. ............... 209/3.1
5,240,116 A 8/1993 Stevens et al. ............. 209/534

* cited by examiner

*Primary Examiner*—Matthew C. Bella
(74) *Attorney, Agent, or Firm*—Dann, Dorfman, Herrell and Skillman; Stephen H. Eland

(57) ABSTRACT

Envelopes with unspecified contents are inspected by a "magnetic imaging" device which operates to identify magnetic indicia associated with the contents of the envelopes in order to identify the orientation of contents within the envelopes and/or to identify magnetic indicia indicative of the magnetic stripe of a credit/debit card or its remnants, in addition to a second detection device (e.g., a thickness measuring device or a metal detecting device) which can then verify whether the indicia indicative of a magnetic stripe signify the presence of a credit/debit card or some other stimulus such as a paper clip or the like. Similar assurances can be provided by employing a thickness measuring device and a metal detecting device, in operative combination (with or without the addition of a magnetic imaging device). Alternatively, the magnetic imaging device may be deleted in favor of a thickness measuring device which, through additional processing, operates to remove subsequent analyses from the time domain in order to achieve a more reliable determination of the contents of an envelope, in less time. Such techniques are applicable to the detection of credit/debit cards contained within the envelopes which are to be processed, as well as the detection of other articles which such envelopes might contain, such as folded documents and the like.

19 Claims, 10 Drawing Sheets

METHOD AND APPARATUS FOR DETECTING CREDIT/DEBIT CARDS IN CONNECTION WITH THE PROCESSING OF BULK MAIL

This is a continuation of U.S. patent application Ser. No. 08/342,635, filed Nov. 21, 1994, which is now abandoned, and which is itself a continuation of U.S. patent application Ser. No. 07/853,411, filed Mar. 13, 1992, which has since become abandoned, each of which applications are hereby incorporated herein by reference.

BACKGROUND OF THE INVENTION

This invention generally relates to the automated processing of bulk mail, and more particularly, to the identification of credit/debit cards contained in the mail which is to be processed.

A variety of organizations customarily receive mail in large quantities and in bulk form, and a number of devices have been developed to facilitate the handling of such mail so as to enhance productivity. One such productivity aid is generally characterized by devices which are used for receiving mail (i.e., envelopes) in bulk form, and for extracting contents (i.e., documents) from such envelopes for subsequent processing. This may simply include an extraction of documents from envelopes, for subsequent processing making use of other devices, or by hand. However, such extraction may further include sorting procedures for directing only specified types of envelopes to the extraction apparatus and/or orienting procedures for organizing the extracted documents prior to their further processing. An example of a comprehensive apparatus of this generally type is the OPEX SYSTEM 100, which is manufactured by Opex Corporation of Moorestown, N.J.

Another such productivity aid is generally characterized by devices for receiving mail (i.e., envelopes) in bulk form, and for analyzing the envelopes which are received to identify those envelopes having contents (i.e., documents) which are to be subjected to special handling. Often, this includes an identification of envelopes containing only an invoice and a corresponding check for its payment, in-order to expedite the processing of such documents so that the checks may enter the banking system as soon as possible. However, other sorting functions may similarly be accomplished to identify the orientation of documents contained within the envelopes and/or to identify envelopes containing credit/debit cards which have been enclosed by the sender for various reasons. Steps can then be taken to sort the series of envelopes according to their detected characteristics. An example of a comprehensive apparatus of this general type is the OPEX MPS-30, which is manufactured by Opex Corporation of Moorestown, N.J.

To achieve their desired function, the above-described extraction devices and sorting devices are often called upon to identify envelopes containing credit/debit cards which have been returned by the sender for various reasons. At times, these cards are returned intact. At other times, these cards are returned in severed form, either due to the preferences of the sender, or responsive to the instructions of the card-issuing entity. In either case, it is important to identify envelopes containing credit/debit cards, or their remnants, in order to remove them from the mail processing operation. This is important for reasons of security, and because the automated processing of such mail in bulk form is generally inappropriate (there is no need to expedite their processing and the card or card pieces can compromise the machinery which follows).

Previously, this was accomplished by measuring the thickness of the envelopes passing through the apparatus, to identify envelopes having a thickness which exceeds a preselected threshold. This is often sufficient to distinguish envelopes containing credit/debit cards from envelopes containing other document combinations (i.e., document combinations comprised of an invoice and a check). Identified envelopes are then removed from the mail being processed by an appropriate sorting device. An example of a thickness measuring device of this type, and an associated sorting device, is disclosed with reference to U.S. Pat. No. 4,863,037, and the scanning and sorting stations which are described, the subject matter of which is incorporated by reference as if fully set forth herein.

However, as previously indicated, other sorting procedures are often employed to identify other parameters associated with the envelopes to be handled, such as to identify the orientation of checks and documents contained within the envelopes which are to be processed. Such devices generally operate to magnetize special ink markings provided on the documents which are contained within the envelopes (e.g., the magnetic ink markings on conventional checks and bank drafts) and to thereafter subject the magnetized ink markings to a detection process which operates to identify the orientation of such documents, even as the documents remain in their surrounding envelope. An example of such a device is disclosed with reference to U.S. Pat. No. 5,036,190, the subject matter of which is incorporated by reference as if fully set forth herein.

In addition to identifying the orientation of documents contained within the envelopes, it was discovered that such detection devices could also identify the magnetic stripe which is conventionally provided on most credit/debit cards for account identifying purposes (or the remaining stripe segments in the event of a severed card). This suggested the possibility of using the orientation determining device to identify envelopes containing credit/debit cards for sorting purposes. However, the implementation of such a device was found to be somewhat less than reliable since it was found that the signals produced by the magnetic stripe or stripe portions of a credit/debit card could at times closely resemble other implements possibly contained in the envelopes such as metallic paper clips or the like.

It therefore became of interest to develop a more reliable means for identifying credit/debit cards contained within envelopes being handled by a mail processing apparatus employing those devices which were previously only employed to identify the orientation of documents within the envelopes.

SUMMARY OF THE INVENTION

It is therefore a primary object of the present invention to provide a method and apparatus for reliably identifying envelopes containing a credit/debit card.

It is also an object of the present invention to provide a method and apparatus for reliably identifying the magnetic stripe of a credit/debit card which is contained within an envelope.

It is also an object of the present invention to provide a method and apparatus for reliably identifying the magnetic stripe of a credit/debit card employing existing devices useful in identifying the orientation of documents contained with the envelopes.

It is also an object of the present invention to provide a method and apparatus for reliably identifying the magnetic stripe of a credit/debit card while within an envelope which is adaptable to existing mail processing equipment including devices for extracting contents from envelopes and devices for sorting envelopes according to desired characteristics.

These and other objects are achieved in accordance with the present invention by providing a system which subjects an envelope with unspecified contents to a "magnetic imaging" device which operates to identify magnetic indicia associated with the contents of the envelopes in order to identify the orientation of contents within the envelopes and/or to identify magnetic indicia indicative of the magnetic stripe of a credit/debit card or its remnants, in addition to subjecting the envelopes to a second detection device (e.g., a thickness measuring device or a metal detecting device) which can then verify whether the indicia indicative of a magnetic stripe signify the presence of a credit/debit card or some other stimulus such as a paper clip or the like. With such verification, an accurate and reliable identification of envelopes containing credit/debit cards is enabled employing magnetic imaging techniques which were previously not sufficiently reliable to do so. What is more, such assurances are provided employing detection devices which are already in use in conjunction with many of the bulk mail processing systems which are presently commercially available. Similar assurances can be provided by employing a thickness measuring device and a metal detecting device, in operative combination (with or without the addition of a magnetic imaging device).

Alternatively, the magnetic imaging device may be deleted in favor of a thickness measuring device which, through additional processing, operates to remove subsequent analyses from the time domain in order to achieve a more reliable determination of the contents of an envelope, in less time. Such techniques are applicable to the detection of credit/debit cards contained within the envelopes which are to be processed, as well as the detection of other articles which such envelopes might contain, such as folded documents and the like.

For further detail regarding the article-detecting devices of the present invention, reference is made to the detailed description which is provided below, taken in conjunction with the following illustrations.

BRIEF DESCRIPTION OF THE DRAWINGS

In the several views provided, like reference numbers denote similar structures.

DETAILED DESCRIPTION OF THE PREFERRED EMBODIMENTS

Figure 1:
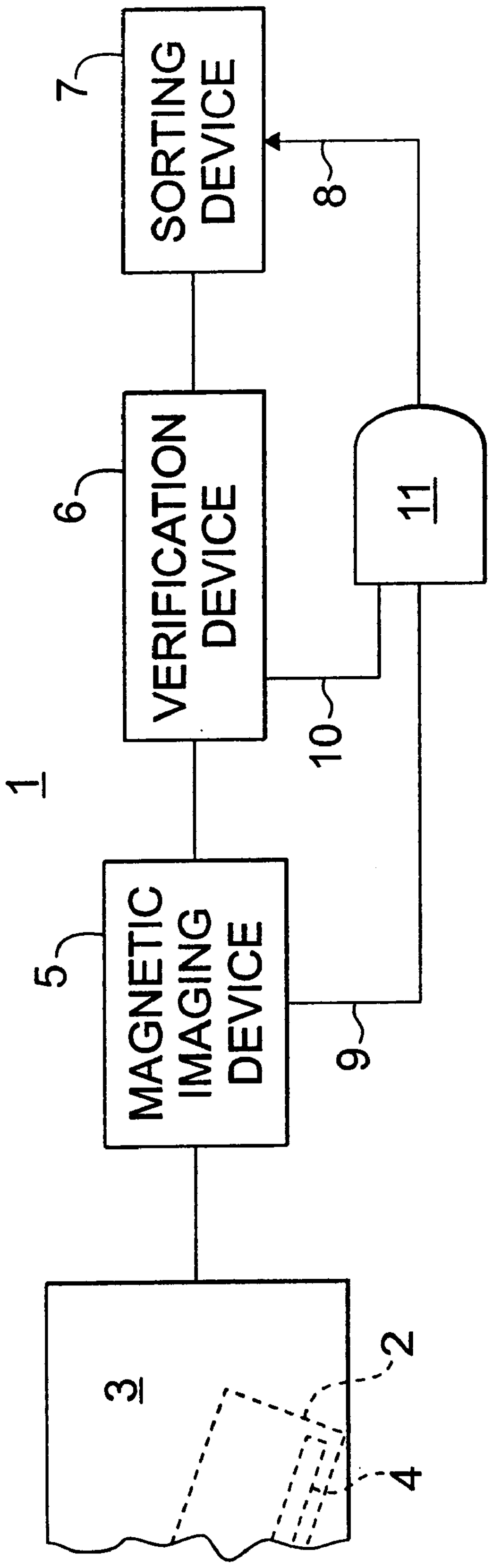
FIG. 1 is a block diagram which schematically illustrates the credit/debit card detection apparatus of the present invention.

FIG. 1 schematically illustrates an apparatus 1 for detecting the presence of a credit/debit card 2 within an envelope 3 which is being handled as part of a mail processing operation. The card 2 will be randomly located within the confines of the envelope 3, enclosed by the opposing faces of the envelope 3, and may either be intact (as shown) or severed into plural pieces. The envelope 3 may either be completely sealed, or edges of the envelope may be severed for the subsequent operations which are to take place. In any event, the apparatus 1 of the present invention is adapted to detect the presence of the card 2 (or its remnant pieces) within the envelope 3, even though surrounded by the paper faces of the envelope 3.

As is conventional, the card 2 will generally include a magnetic stripe 4 which is comprised of an oxide compound capable of storing account-related information necessary in conjunction with use of the card 2. At times, the magnetic stripe 4 will be intact (if the card 2 is intact), and randomly oriented within the envelope 3. At other times, the magnetic stripe 4 will be separated into plural segments (if the card 2 is severed), causing plural segments of the magnetic stripe 4 to be randomly dispersed within the envelope 3. The apparatus 1 of the present invention is capable of accounting for all such variations.

To this end, the series of envelopes 3 to be processed are introduced into a magnetic imaging device 5 which is capable of scanning the envelope 3, as well as its contents, to detect and identify magnetic indicia on articles contained within the envelopes 3. The envelopes 3 are additionally introduced into a verification device 6 which operates to detect other parameters associated with the envelopes 3, such as the thickness of the envelopes or possibly their transmissivity to light. To be noted is that although the magnetic imaging device 5 is shown preceding the verification device 6, this order is not essential to proper operation of the apparatus 1. Instead, the verification device 6 could precede the magnetic imaging device 5, if desired.

The envelopes 3 are then introduced into a sorting device 7 which operates to separate envelopes exhibiting a particular characteristic (e.g., those which contain a credit/debit card) from other envelopes which do not exhibit that same characteristic. To this end, the sorting device 7 may incorporate a solenoid-controlled gating device (not shown) for selectively directing the envelopes 3 to and between one or more sorting bins, as desired. Signals 8 for regulating operations of the sorting device 7 are produced responsive to signals 9, 10 received from the magnetic imaging device 5 and the verification device 6, respectively. Coincidence of the signals. 9, 10 (shown schematically as an AND circuit 11) causes the sorting device 7 to assume a first state which is responsive to the identification of a card 2, or its remnants, contained within the envelope 3 then under inspection.

Non-coincidence of the signals 9, 10 received from the magnetic imaging device 5 and the verification device 6 causes the sorting device 7 to assume a second state which is responsive to the identification of an envelope 3 which does not contain a card 2 or its remnants.

Figure 2:
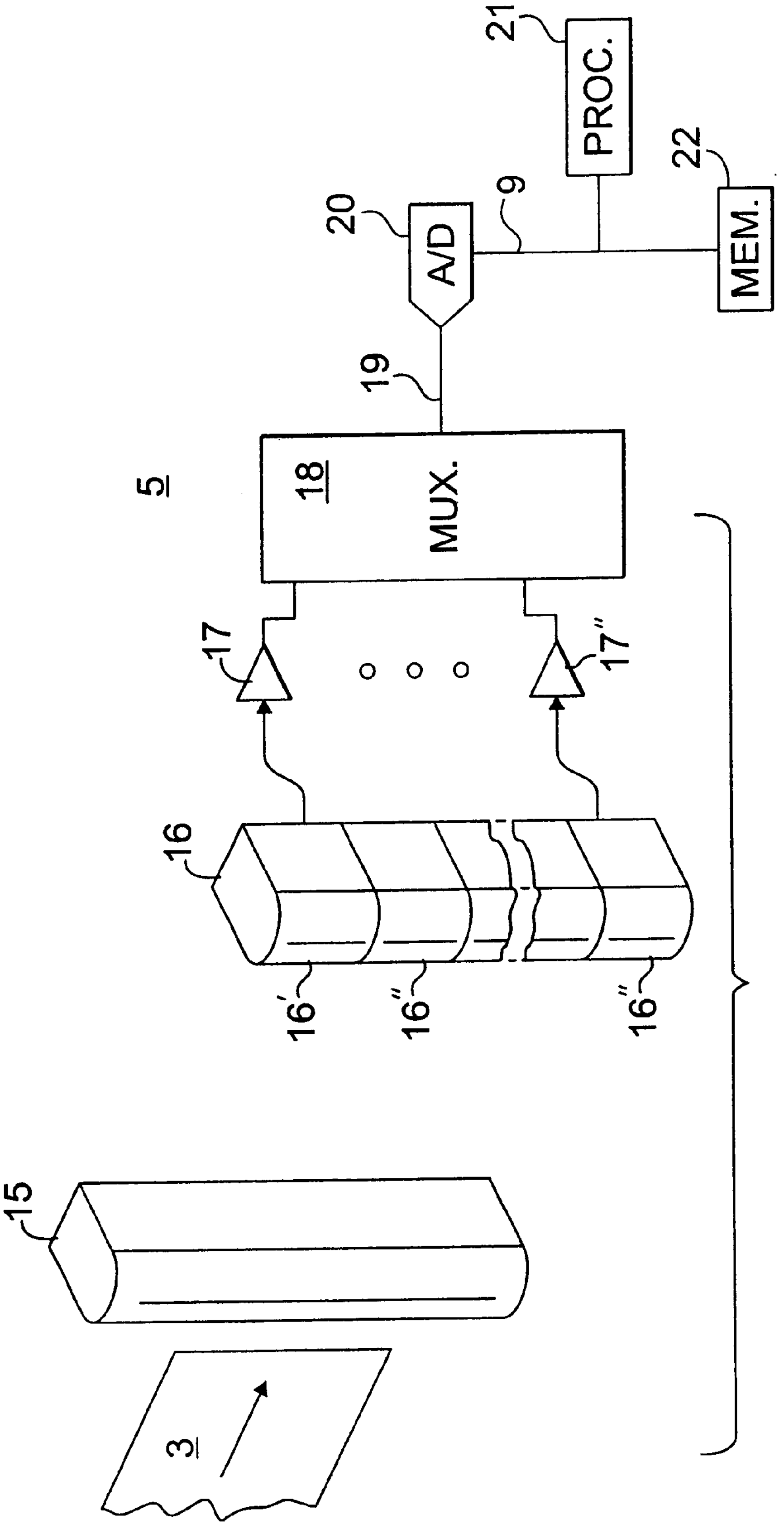
FIG. 2 is a schematic diagram of a magnetic imaging device useful in conjunction with the apparatus which is shown in FIG. 1.

FIG. 2 schematically illustrates the magnetic imaging device 5, and its manner of operation. In this case, envelopes 3 are first caused to proceed past a magnetizing head 15 which is used to uniformly orient magnetic indicia which might be present on contents of the envelope 3. This is done to facilitate the subsequent detection of any magnetic indicia which might be present (due to the uniform magnetization of such indicia by the head 15). Following this, the envelopes 3 are caused to pass a detection fixture 16 which is then used to detect the presence of magnetic indicia on contents of the envelope 3 then under inspection. To this end, the detection fixture 16 is preferably comprised of a series of magnetic heads 16', 16", . . . , 16$^n$. The number of magnetic heads 16', 16", . . . , 16$^n$ which are employed is freely variable according to the sensitivity (number of scanning lines) which is desired for a particular application. This will be determined not only by the need to detect the magnetic stripe of a credit/debit card, but also in order to detect other magnetic ink markings which might be present such as the MICR (Magnetic Ink Character Recognition) line which is conventionally provided on most checks or magnetic bar-coded information which is at times provided on invoices and the like. A series of sixteen magnetic heads in a single detection fixture 16 has presently been found to be sufficient for most applications.

Electrical signals produced by the series of magnetic heads 16', 16", . . . , 16$^n$ are respectively coupled to a series of amplifiers 17, . . . , 17$^n$ for suitable amplification prior to introduction into a multiplexing circuit 18. The multiplexing circuit 18 in turn operates to assemble the parallel signals which are received from the amplifiers 17, . . . , 17$^n$ into a serial signal 19 for introduction into an analog-to-digital converter 20. Following conversion to digital form, such electrical signals (which in essence correspond to the signal 9 of FIG. 1) are introduced into a processor 21 and associated memory 22 for subsequent analysis.

In analyzing the contents of a given envelope 3, the first step which is taken is to create a two-dimensional array (magnetic image) comprised of one-dimensional "snap shots" of the magnetic field (signals) simultaneously detected by the linear series of magnetic heads 16', 16", . . . , 16$^n$. The second dimension for the image is created by movement of the envelope 3 across the magnetizing head 15 and the detection fixture. 16, sampled at spaced intervals (preferably at regular intervals timed responsive to the speed and distance of travel for the envelopes 3). Such techniques are not unlike the techniques which are used to analyze checks bearing a MICR line, but along plural lines (at differing heights) which are defined by the several magnetic heads of the detection fixture 16.

Following the development of this two-dimensional array, corresponding to the magnetic image of contents of the envelope 3 then under inspection, steps can then be taken to analyze the magnetic image to identify characteristic features associated with it. This can include a determination of characteristic features associated with the MICR line of a check, for purposes of determining the orientation of that check using techniques which are presently employed in conjunction with the OPEX MODEL 100 extraction apparatus and the OPEX MPS-30 sorting apparatus which are presently manufactured by Opex Corporation of Moorestown, N.J. However, in accordance with the present invention, this can further include a determination of other characteristic features associated with the envelope 3, including the presence of a magnetic stripe 4 of a card 2 contained within the envelope 3, or the remnants of a magnetic stripe 4 associated with the plural segments of a severed card 2 contained within the envelope 3. Such determinations may be made by analyzing (processor 21) the data which is then present in memory 22 using techniques similar to those techniques which were previously employed in determining the orientation of documents contained within the envelopes being processing by known mail processing devices.

However, unlike the detection of characteristic features associated with a MICR line of a check, which are reliably identifiable, the characteristic features indicative of a magnetic stripe 4 of a card 2 are not so reliably identifiable due to their similarity to other stimuli having similar overall characteristics such as paper clips, or even staples contained within the envelopes. For example, the magnetic imaging device 5 will tend to produce electrical signals for an intact magnetic stripe 4 which are not unlike the signals which would be produced for a jumbo paper clip similarly, the electrical signals produced for the remnants (segments) of a magnetic stripe 4 will be similar to the signals which would be produced for smaller paper clips, or possibly, larger staples. Consequently, and in accordance with the present invention, the envelopes 3 are subjected to a verification procedure (verification device 6) which can distinguish the magnetic stripe 4 (or remnants) of a card 2 from other metallic objects such as paper clips and staples.

To be noted is that as the envelopes 3 are conveyed past the magnetizing head 15, a tangential field is imparted to any magnetizable indicia which might be associated with that envelope 3. As a consequence, magnetic flux lines will now emanate from such indicia, in substantial strength, and will become time varying as a result of motion of the envelope 3 through the magnetic imaging device 5. As these time varying flux lines encounter a magnetic head 16', 16", . . . , 16$^n$, a voltage is generated (which is amplified to a 0–5 volt range by the amplifiers 17, . . . , 17$^n$) which can not only identify the magnetic stripe 4 or its remnants, as previously described, but which can also detect other magnetic indicia which are present on documents which are contained by the envelope 3 then under inspection. This may include the detection and analysis of MICR coding, for determining the orientation of a check inside the envelope 3, as well as the detection of encoded magnetic markings applied to other documents. Analysis of the resulting magnetic image may therefore be used to implement additional and, if desired, plural sorting functions.

Figure 3:
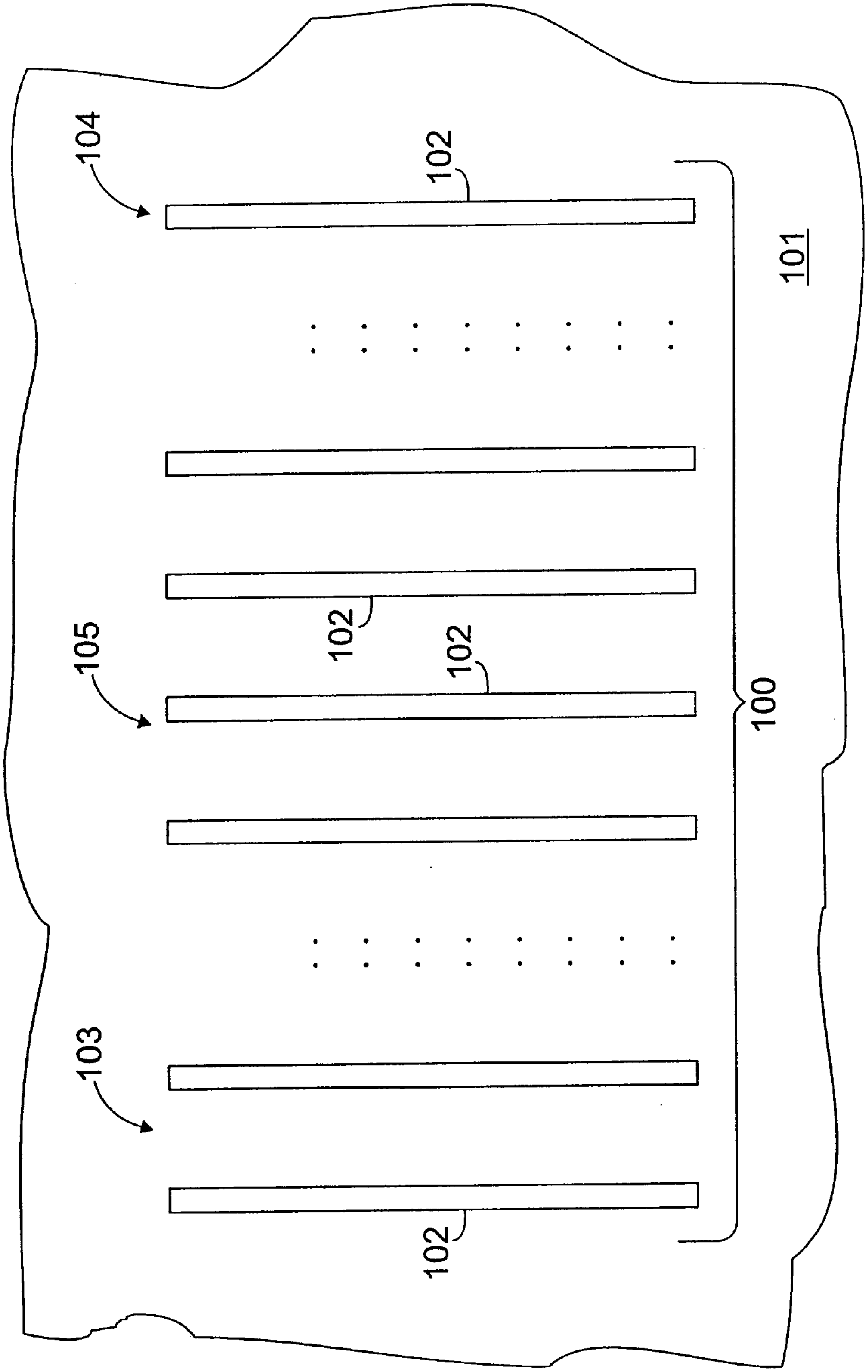
FIG. 3 is an illustrative plan view of additional coded indicia which may be detected and analyzed with the apparatus which is shown in FIG. 2.

FIG. 3 illustrates an example of encoded magnetic markings 100 that may be applied to a document 101 (e.g., an invoice or a coupon) for detection and analysis in accordance with the present invention. In this configuration (which may be freely varied according to the coding which is employed), a series of bars 102 are imprinted with magnetic ink on one side of a coupon 101. Preferably, there is no other magnetic ink on the coupon 101, and the coupon 101 is just slightly smaller than the return envelope 3 which contains it. As a result of this, the encoded markings 100 will be in a known position which is not subject to significant skew. The height and vertical placement of the bars 102 is preferably selected to permit a portion of the MICR line on a check to be exposed outside of the area of the coupon 101 which contains the bars 102. This will ensure that the presence of a check can be determined simultaneously with detection of the encoded markings 100. The bars 102 are preferably encoded in a pattern which includes a start grouping 103 of two bars and a stop grouping 104 of one bar. This provides asymmetry so that in event that the coupon 101 is inserted in a "windowless" envelope, the coded information which it represents is determinable irrespective of its orientation within the envelope 3, permitting the envelope 3 to be correctly sorted as presented. The spacing of the bars 102 is preferably uniform throughout the encoded strip 100. The data-defining series of bars 105 located between the start code 103 and the stop code 104 can be used to establish any desired binary code signifying particular sort groups.

Figure 4:
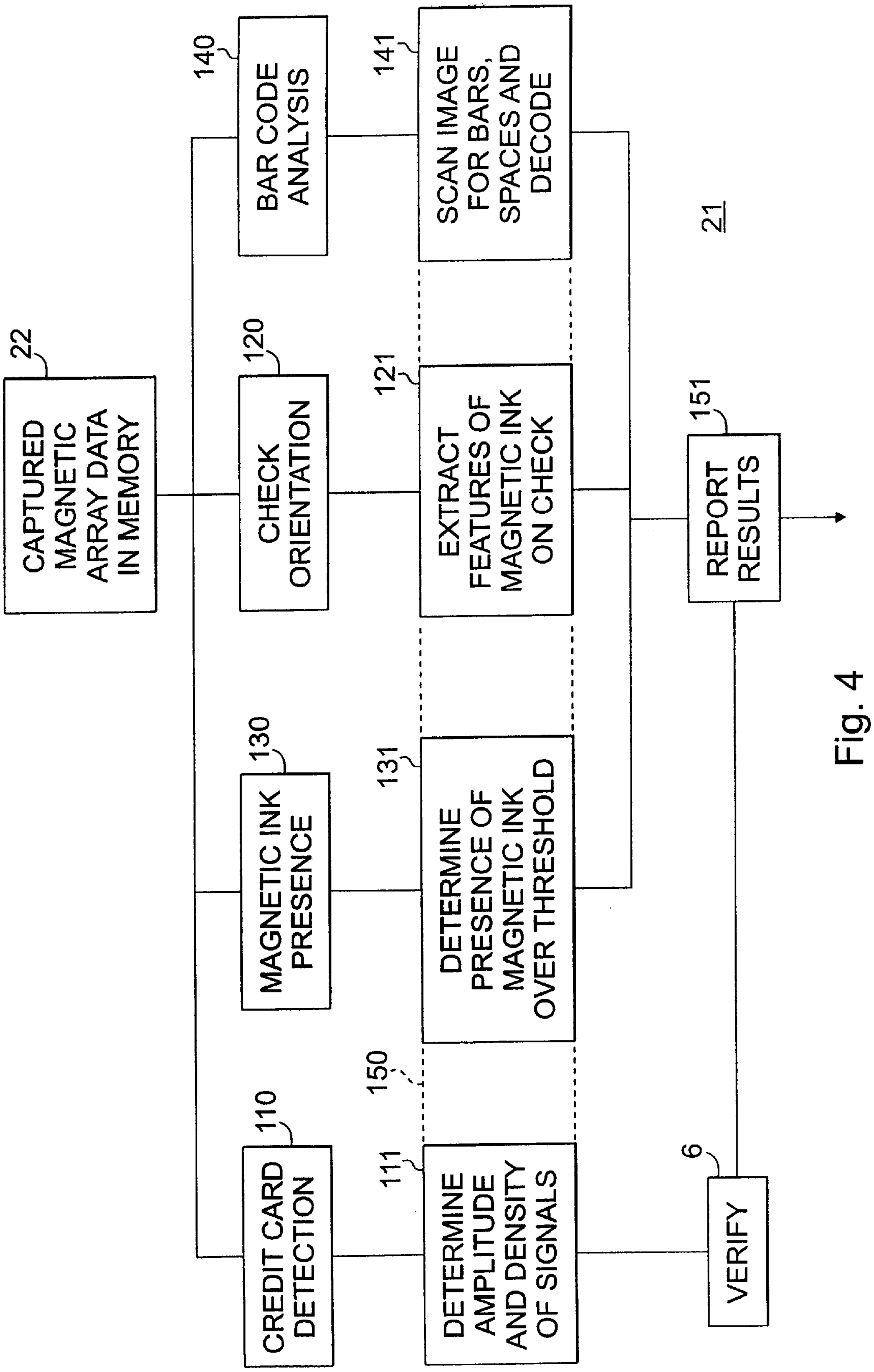
FIG. 4 is a block diagram which illustrates a flow chart for analyzing a magnetic image with the apparatus which is shown in FIG. 2.

FIG. 4 schematically illustrates the analysis of a magnetic image (then in memory 22) developed by the magnetic imaging device 5 to accomplish desired sorting functions. As previously indicated, magnetic images corresponding to envelopes passing through the magnetic imaging device 5 are received in memory 22 as a two-dimensional array of data elements (i.e., "magnetic" pixels). The processor 21 operates to analyze these two-dimensional arrays, as desired. This can include the detection of a card 2 (or its remnants), at 110; a determination of the orientation of a check (or other document) contained within the envelope 3, at 120; a determination of the presence of magnetic ink markings (signifying either a check or a magnetically encoded invoice or coupon) on documents contained within the envelope 3, at 130; and/or an analysis (decoding) of bar-coded information on a document contained within the envelope 3, at 140. These functions may be selected either individually, or in desired combinations, depending upon the mail which is to be processed, the mail processing equipment which is being used, and the sorting procedures which are desired.

Depending upon the analyses which are to be performed, the processor 21 then operates to analyze (shown collectively as a processing unit 150) each two-dimensional array in memory 22 in order to make those determinations which are called for. Irrespective of the determinations which are desired, such analyses are generally accomplished by performing a pixel by pixel comparison of each two-dimensional array (magnetic image) with a preselected norm (or model) which is present in memory 22. Such comparisons are made by determining whether the amplitude of the signal corresponding to an identified pixel exceeds (or does not exceed) a threshold value defined by the model which is then stored in memory 22. Such thresholds may vary from pixel to pixel, or a series of comparisons may be made against a single threshold corresponding to a series of pixels associated with the comparison model. Depending upon the analyses which are to be performed, these comparisons can additionally be averaged and/or weighted by computations within the processing unit 150, if desired.

The pixel by pixel comparisons performed by the processing unit 150 are then interpreted in order to make those determinations which are desired. For example, in testing for the presence of a credit/debit card, at 110, the overall amplitude and density of signals associated with the magnetic image is analyzed, at ill. In determining the orientation of a check, at 120, features associated with the MICR line on the check are analyzed, at 121, employing techniques which are disclosed, for example, in U.S. Pat. No. 4,863,037 with reference to the detection station which is described. To be noted is that in order to determine the orientation of a check (at 120), unlike other determinations which can be made (at 110, 130, 140), two spatially oriented features need to be identified for an effective analysis to be performed. This is necessary to positively identify the orientation of a check (within its envelope), which cannot be determined by analyzing only a single feature associated with the MICR line. Other determinations (110, 130, 140) can generally be made by analyzing only a single feature identified within the magnetic image which is then under inspection. However, plural or even multiple features associated with a particular magnetic image may be analyzed, if desired, to further distinguish between the several articles which may be contained within a particular envelope 3. In determining the presence of magnetic ink markings on a document, at 130, signals exceeding a defined threshold are identified, at 131. In decoding bar-coded information, at 140, the magnetic image is analyzed for bars and spaces, at 141, which are then decoded employing techniques which are conventionally applied to decode bar-coded information.

Determinations resulting from operations of the processing unit 150, and the computational units 111, 121, 131, 141 which it includes, are then collected by a reporting unit, at 151. The reporting unit 151 generally operates to deliver signals, as appropriate, to other devices associated with the mail processing equipment which is being employed, or to monitors associated with such mail processing equipment. As is generally preferred, signals associated with the detection of a credit/debit card, at 111, are first correlated with signals received from the verification device 6, for verification as previously described prior to distribution by the reporting unit 151.

Figure 5:
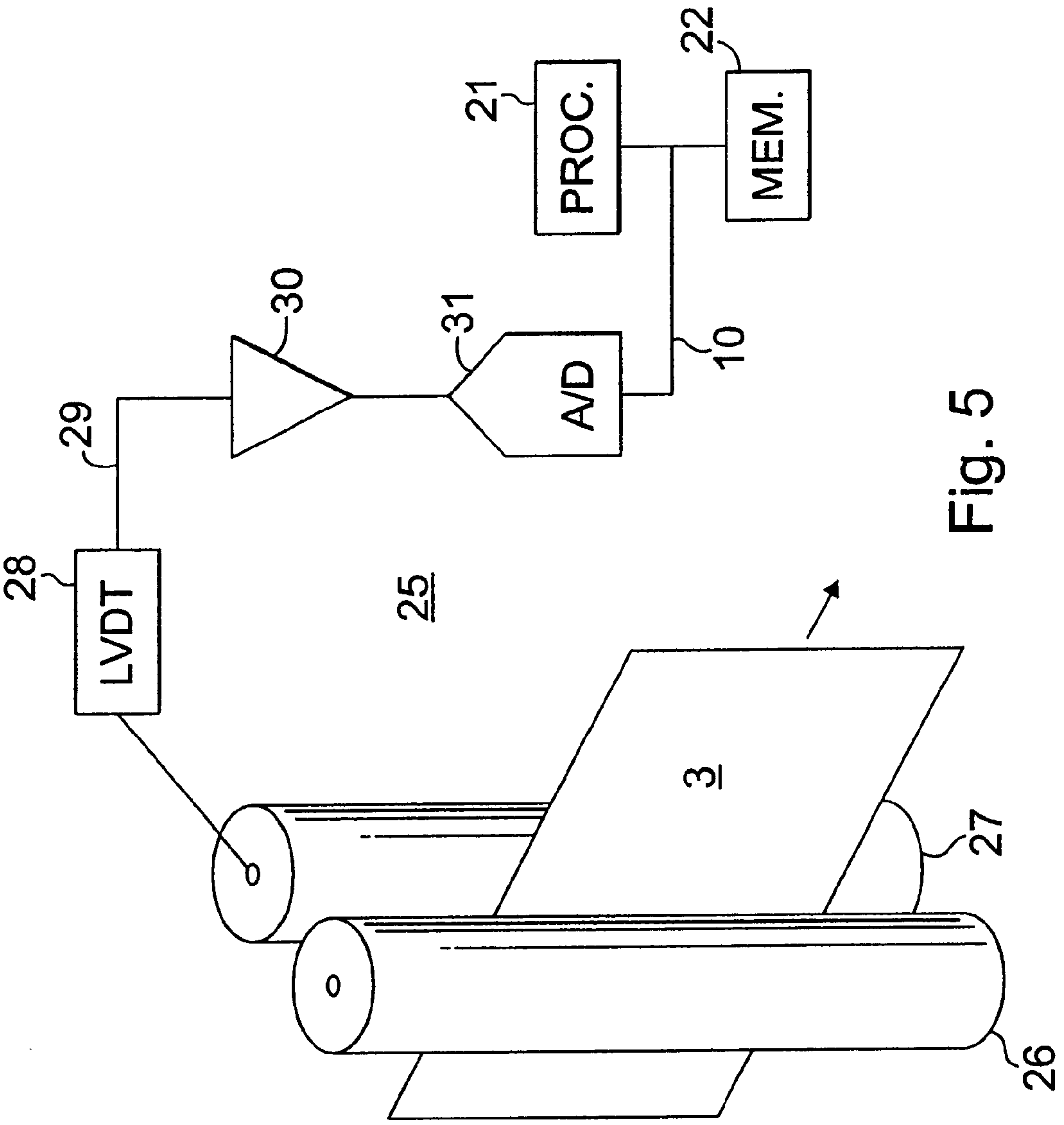
FIG. 5 is a schematic diagram of a thickness measuring device which is useful as the detection device which is shown in FIG. 1.

FIG. 5 schematically illustrates a thickness measuring device 25 which can be used to implement the verification device 6 as previously described. In this device, the envelopes 3 are passed between a pair of rollers 26, 27. The roller 26 is fixed in position, and the roller 27 is biased into position adjacent to the roller 26 so that the envelope 3 and its contents will cause movement of the roller 27 relative to the fixed roller 26 in accordance with variations in such thickness. The roller 27 is mechanically coupled with a device 28 (e.g., a linear variable differential transformer) for converting mechanical movements of the roller 27 into electrical signals 29 for further processing. The electrical signals 29 are introduced into an amplifier 30, for amplification prior to introduction into an analog-to-digital converter 31. Digital signals produced by the converter 31 (which in essence correspond to the signal 10 of FIG. 1) are then introduced into the processor 21 and associated memory 22, for analysis in conjunction with the electrical signals (the signal 9 of FIG. 1) developed by the magnetic imaging device 5.

As previously indicated, the verification device 6 (in this case the thickness measuring device 25) operates to verify signals produced by the magnetic imaging device 5. If the magnetic imaging device 5 identifies magnetic indicia conforming to the anticipated configuration of a magnetic stripe 4, or its remnants, and the verification device 6 detects a thickness in excess of a prescribed threshold (e.g., 30 mils, which corresponds to the nominal thickness of most credit/debit cards), the contents of the envelope 3 are assumed to include a card 2, for sorting as desired (sorting device 7). If the magnetic imaging device 5 does not identify magnetic indicia indicative of a magnetic stripe 4, or its remnants, or the verification device 6 does not detect a thickness in excess of the prescribed threshold, it is assumed that the envelope 3 does not include a card 2 but rather includes other contents (e.g., a check bearing magnetic ink markings, a staple or paper clip, etc.). Thus, the verification device 6 provides desired supplemental information for distinguishing between envelopes containing a credit/debit card, and envelopes containing other articles. Such comparisons are readily accomplished by the processor 21 using techniques which are in and of themselves known.

Figure 6:
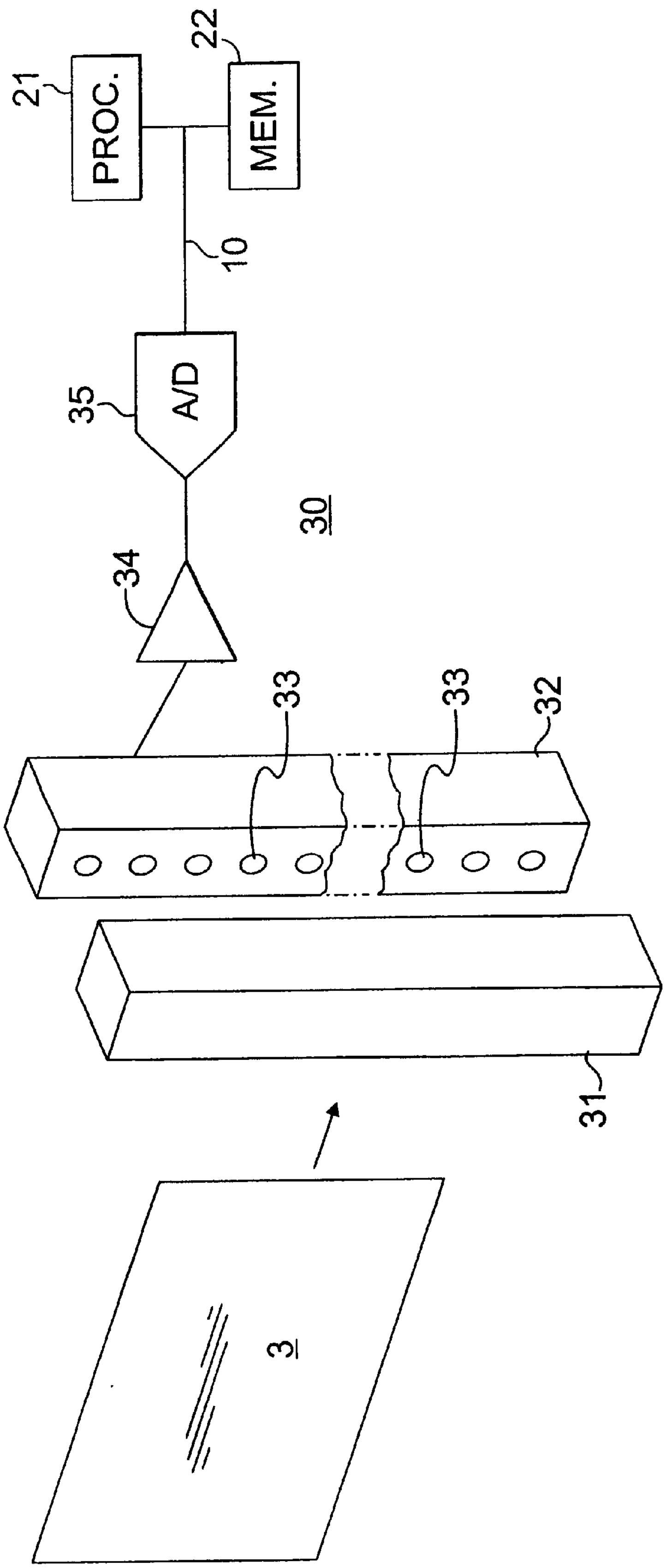
FIG. 6 is a schematic diagram of an optical inspection device which is useful as the detection device which is shown in FIG. 1.

FIG. 6 schematically illustrates a candling device 30 which can also be used to implement the verification device 6, representing an alternative to use of the thickness measuring device 25. In this device, the envelopes 3 are passed between a pair of fixtures 31, 32 containing means for optically inspecting the envelopes 3 as they pass between them. To this end, the fixture 31 incorporates a series of light-emitting elements (visible or infrared) and the fixture 32 incorporates a corresponding series of photoreceptors 33 for detecting radiation which is emitted by the elements of the fixture 31, and which has passed through the envelope 3 (and any contents) under inspection. For example, and as is presently preferred, the fixture 31 can incorporate a series of photo-diode emitters and the fixture 32 can incorporate a series of photo-transistor receivers, to achieve the desired result. Any number of emitter/receptor pairs may be employed for this purpose, with sixteen such pairs being preferred to obtain sufficient data for a thorough analysis of the envelopes which are to be inspected.

Electrical signals received from the fixture 32 are amplified, at 34, and introduced into an analog-to-digital converter 35. Digital signals produced by the converter 35 (which in essence correspond to the signal 10 of FIG. 1) are then introduced into the processor 21 and associated memory 22, for analysis in conjunction with the electrical signals (the signal 9 of FIG. 1) developed by the magnetic imaging device 5 as previously described in connection with operations of the thickness measuring device 25.

It should be noted that as with the magnetic heads comprising the fixture 16 of the magnetic imaging device 5, the series of emitter/receptor pairs comprising the fixtures 31, 32 of the candling device 30 employ the movement of the envelopes 3 through the fixtures 31, 32 to develop a two-dimensional array imaging the transmissivity of light through the envelope 3 then under inspection. Employing processing techniques which are disclosed in U.S. Pat. No. 5,036,190, an image of the optical density for each envelope 3 is developed and analyzed in the processor 21 to determine the location and opacity of any objects contained with the envelope 3 under inspection. Since most documents which will ordinarily be present in the envelope 3 are to some extent transparent, and since a credit/debit card will ordinarily be virtually opaque, steps can then be taken to identify opaque regions developed within each envelope 3 to identify either an intact card 2, or the remnants of a severed card, which can then be used as a verification (at 10) of the signals (at 9) which are developed by the magnetic imaging device 5.

Thus, by virtue of the foregoing operations, either the thickness measuring device 25 or the candling device 30 may be used to develop the function of the verification device 6 in accordance with the present invention. Other verification devices may also be devised, if desired. Which device is ultimately employed will depend upon the apparatus with which the system 1 of the present invention is to be associated, the availability of any devices (the devices 25, 30, or others) which may already form a part of that apparatus, as well as cost and simplicity. For example, many automated mail extraction devices and mail sorting devices already include a thickness measuring device corresponding to the thickness measuring device 25 previously described. In such cases, the existing thickness measuring device may serve as the verification device 6. Many automated mail extraction devices and mail sorting devices also include a device for detecting metallic objects contained within the envelopes which are to be inspected. In such cases, the existing metal detecting device may serve as the verification device 6. In other cases, it may be desirable to employ the candling device 30 since this device is somewhat simpler, lower in cost, and able to develop a true profile of the contents of an envelope, rather than measuring a single parameter (e.g., thickness) associated with that envelope. In such cases, the candling device 30 may serve as the verification device 6. All that is necessary for such applications is to provide a device which is capable of producing a verification signal 10 for comparison with the control signal 9, to provide operating signals 8 to the sorting device 7 as previously described.

It will therefore be understood that various changes in the details, materials and arrangement of parts which have been herein described and illustrated in order to explain the nature of this invention may be made by those skilled in the art within the principle and scope of the invention as expressed in the following claims. Some of these variations have previously been discussed. Other such variations will be readily apparent to the person of ordinary skill in the art.

For example, in addition to the above-described variations, additional detection devices may be employed in accordance with the present invention to further facilitate the sorting process and/or to further facilitate subsequent mail handling procedures which are to take place. To this end, a metal detecting device may be employed to identify staples and paper clips and thereby distinguish such implements from the magnetic stripe of a credit/debit card. The use of metal detecting devices is of interest since such devices detect ferrous and/or non-ferrous metals, but will not detect the presence of ferrous oxides (e.g., magnetic stripes, magnetic (MICR) ink on checks or other documents, etc.). This can provide an appropriate verification signal for use in accordance with the present invention, under appropriate circumstances, or even an additional (secondary) verification signal if desired for added reliability. Alternatively, the magnetic imaging device may be combined with a metal detecting device, with a thickness measuring device serving as the additional detection device, or a metal detecting device may be combined with a thickness measuring device, with a magnetic imaging device serving as the additional detecting device.

It is also possible, in appropriate situations, to delete use of the magnetic imaging device 5, and to employ an operative combination of a thickness measuring device 25 and a candling device 30 in accordance with the present invention. In this configuration, signals produced by the thickness measuring device 25 can be compared with signals produced by the candling device 30 in order to control desired sorting procedures. The combination of devices which is employed in accordance with the present invention will generally depend upon the anticipated mix (contents) of incoming mail to be analyzed, as well as the primary sorting functions which are desired (e.g., identification of credit/debit cards, check/document pairs, additional documents not anticipated, etc.), and the mail processing equipment (and its discrete components) with which the system 1 of the present invention is to be used.

It is even possible, although in practice often less preferred, to employ only a magnetic imaging device 5, or a thickness measuring device 25, or a candling device 30 to identify credit/debit cards contained within the envelopes which are to be processed. This is because, ordinarily, such configurations can be somewhat limited in reliability, and are therefore generally useful only in conjunction with limited mixes (anticipated uniformity) of incoming mail. However, and further in accordance with the present invention, it has been found that a thickness measuring device which can by itself reliably process varied mixes of mail can be implemented by modifying the manner in which the information (data) which is developed by existing thickness measuring devices is processed. Such modifications are illustrated with reference to FIGS. 7*a*, 7*b* and 7*c* of the drawings.

Figure 7C:
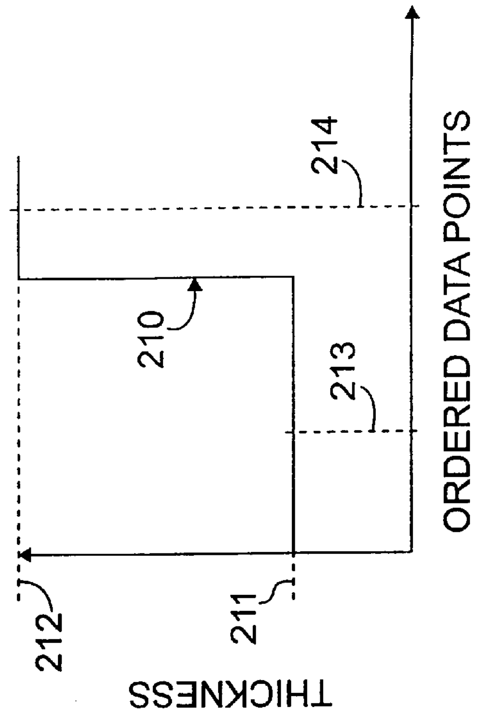
FIGS. 7*a*, 7*b* and 7*c* are graphs illustrating operations of an alternative embodiment thickness measuring device produced in accordance with the present invention.
Figure 7B:
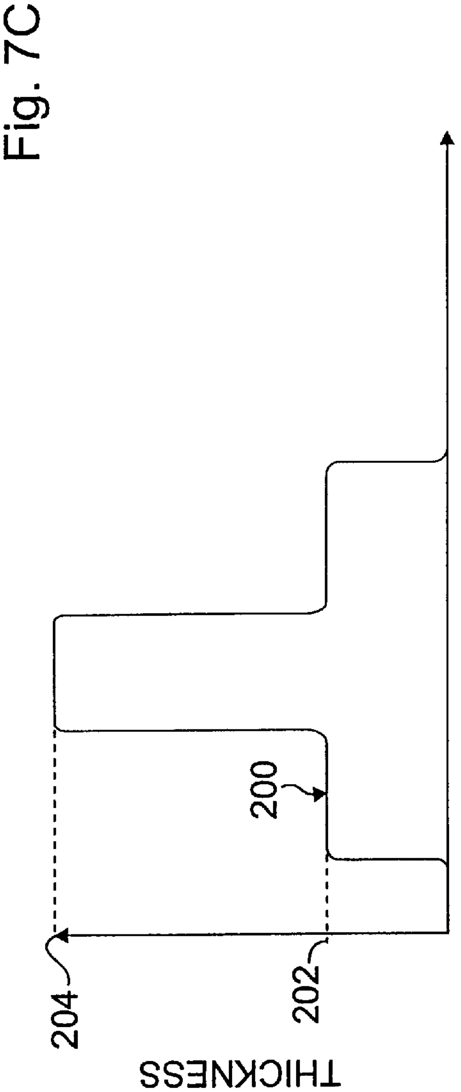
Figure 7A:
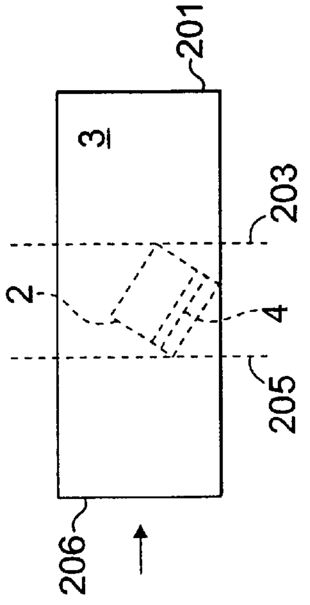
Figure 8A:
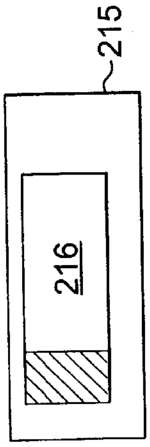
FIGS. 8*a*–8*d* schematically illustrate four envelope (with contents) configurations for analysis with the alternative embodiment thickness measuring device.
Figure 8B:
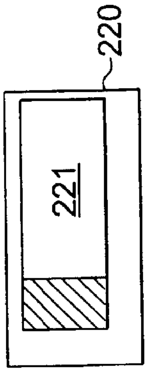
Figure 9A:
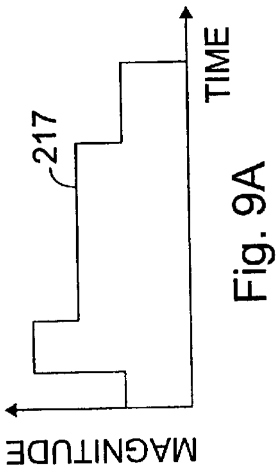
FIGS. 9*a*–9*d* are graphs which illustrate thickness measurements for the envelopes shown in FIGS. 8*a*–8*d*, in a time domain.
Figure 9B:
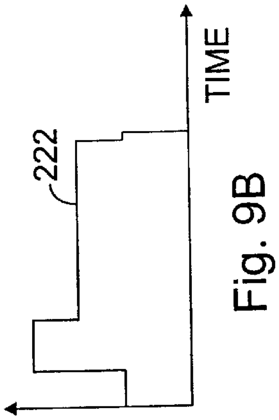
Figure 10A:
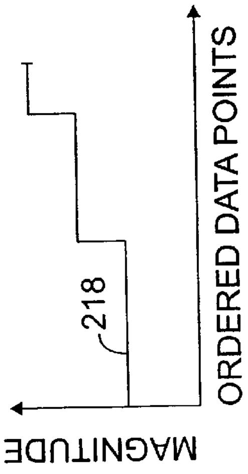
FIGS. 10*a*–10*d* are graphs which illustrate sorted thickness measurements for the envelopes shown in FIGS. 8*a*–8*d*, in a spacial domain.
Figure 10B:
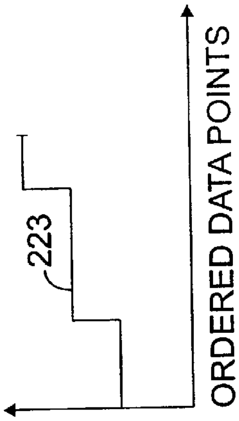
Figure 8C:
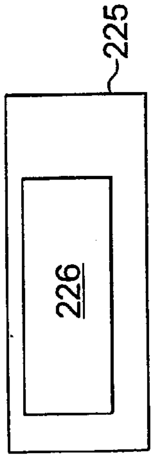
Figure 8D:
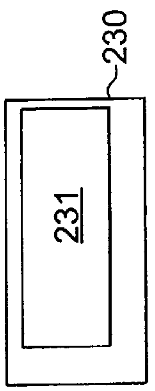
Figure 9C:
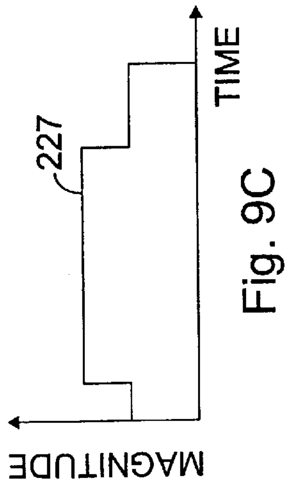
Figure 9D:
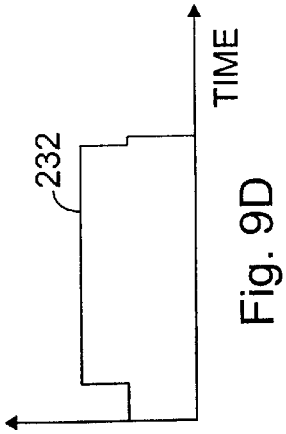
Figure 10C:
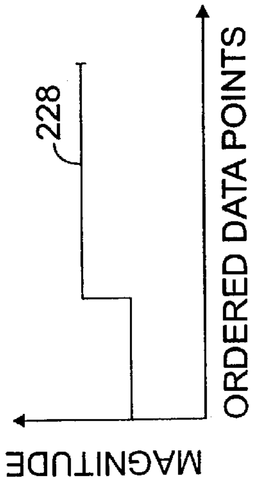
Figure 10D:
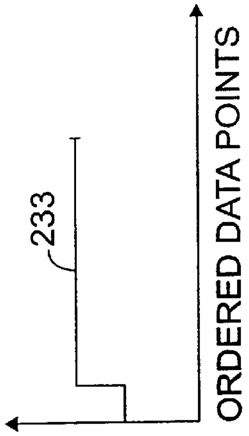

FIG. 7*a* illustrates an envelope 3 which contains a credit/debit card 2 which is randomly oriented within the confines of the envelope 3. FIG. 7*b* shows (the characteristic curve 200) the resulting electrical signals which would ordinarily be produced (at the output of the amplifier 30 of FIG. 3) by existing thickness measuring devices. As illustrated, upon encountering the leading edge 201 of the envelope 3, the characteristic curve 200 exhibits a transition from zero to a first level 202 corresponding to the thickness of the envelope 3 which is then proceeding through the thickness measuring device. Upon encountering the card 2, at 203, the characteristic curve 200 exhibits a second transition, from the first level 202 to a second level 204. The characteristic curve 200 then exhibits a third transition as the card 2 passes from between the thickness measuring device, at 205, returning to the first level 202 (originally established for the envelope 3 by itself). The characteristic curve 200 then exhibits a final transition, back to zero, as the trailing edge 206 of the envelope 3 passes from between the thickness measuring device. As a result, and as is conventional, the characteristic curve 200 operates to define the "profile" of an envelope 3 passing through the thickness measuring device, over time.

Ordinarily, such data would be analyzed (processor 21) to make determinations regarding encountered thickness transitions, and accordingly, envelope contents. However, the computations required for such analyses are time consuming, and at times not sufficiently reliable to effectively distinguish between the different types of articles which may be contained within a given envelope 3.

In accordance with the present invention, steps are taken to, in essence, remove the characteristic curve 200 from its time domain, for placement within a spatial domain which operates to eliminate those limitations ordinarily encountered in processing the electrical signals in a time domain. Referring to FIG. 7*c*, this is accomplished by sorting the thickness measurements which are represented by the characteristic curve 200, thereby developing a thickness distribution 210 of the thickness measurements which were initially made over time. Such sorting may be performed either in an ascending or a descending order, as desired. In the illustrative example of FIG. 7*c*, such sorting is performed in ascending order.

As a consequence of this sorting procedure, the thickness distribution curve 210 first exhibits a level 211 which essentially corresponds to the thickness of the envelope 3 by itself. Thereafter, the thickness distribution curve 210 exhibits a transition, to a second level 212 which corresponds to the thickness measurements encountered in the region of the envelope 3 which contains the card 2. This, in essence, isolates those thickness measurements associated with an article or articles contained within the envelope 3 from the characteristics of the envelope 3 by itself.

Because of this, it is no longer necessary to analyze an entire characteristic curve (the curve 200) in the time domain, but rather is only necessary to analyze the thickness distribution curve 210 at selected indexing points 213, 214. The indexing points 213, 214 are empirically selected, and will vary depending upon the types of envelopes which are to be processed and the types of articles which are expected to be contained by the envelopes. Generally, the indexing points 213, 214 will be selected relative to the ends of the distribution curve 210. For example, the indexing point 213 is preferably measured relative to the "thin" (envelope only) end of the distribution curve 210 while the indexing point 214 is preferably measured relative to the "thick" (envelope and contents) end of the distribution curve 210. Upon obtaining thickness measurements at the indexing points 213, 214, only a single subtraction (which represents the relative thickness of the contents of the envelope) is required to reliably identify articles contained within the envelope 3. Although only two indexing points (and a single subtraction) are necessary to reliably identify an article contained within the envelope 3 which is being inspected, it should be noted that multiple indexing points and plural subtractions may be employed in accordance with the present invention to achieve even greater reliability, and to facilitate the identification of multiple articles which might be contained within a single envelope 3.

In any event, such processing affords a significant increase in speed since the data needs to be sorted only once, and since fewer measurements (only at the selected indexing points) need to be processed to reliably identify articles contained within an envelope. What is more, actual thickness measurements are no longer required, since relative measurements are employed. This operates to effectively eliminate imprecision resulting from irregularities in envelope construction.

In addition to facilitating the detection of credit/debit cards, the foregoing techniques also afford a significant improvement in identifying envelopes containing folded documents (or, using similar techniques, plural documents). Previously, in order to identify folded documents, the characteristic curve 200 produced by a thickness measuring device had to be processed in plural passes in order to locate the multiple imperfections resulting from a folded document. In accordance with the present invention, this is effectively eliminated by employing the above-described processing techniques, as is best illustrated with reference to FIGS. 8 through 11 of the drawings.

FIGS. 8*a*–8*d* collectively illustrate four different envelopes 215, 220, 225, 230, each of which encloses a check 216, 221, 226, 231, respectively. To be noted is that the envelopes 215, 225 are somewhat larger (e.g., a No. 10 envelope), while the envelopes 220, 230 are somewhat smaller (e.g., a conventional bill mailer). Further to be noted is that the checks 216, 221 are folded over, while the checks 226, 231 are not.

FIGS. 9*a*–9*d* illustrate the corresponding thickness measurements 217, 222, 227, 232 obtained over time as the checks 216, 221, 226, 231 pass through the thickness measuring device. Transitions in the characteristic curves 217, 222, 227, 232 correspond to changes in thickness encountered in operating upon the envelopes 215, 220, 225, 230.

FIGS. 10*a*–10*d* illustrate the corresponding thickness distribution curves 218, 223, 228, 233 which are produced in accordance with the present invention by sorting the thickness measurements represented by the characteristic curves 217, 222, 227, 232. In this illustrative example, these thickness distribution curves are developed by sorting the thickness measurements in ascending order.

Figure 11:
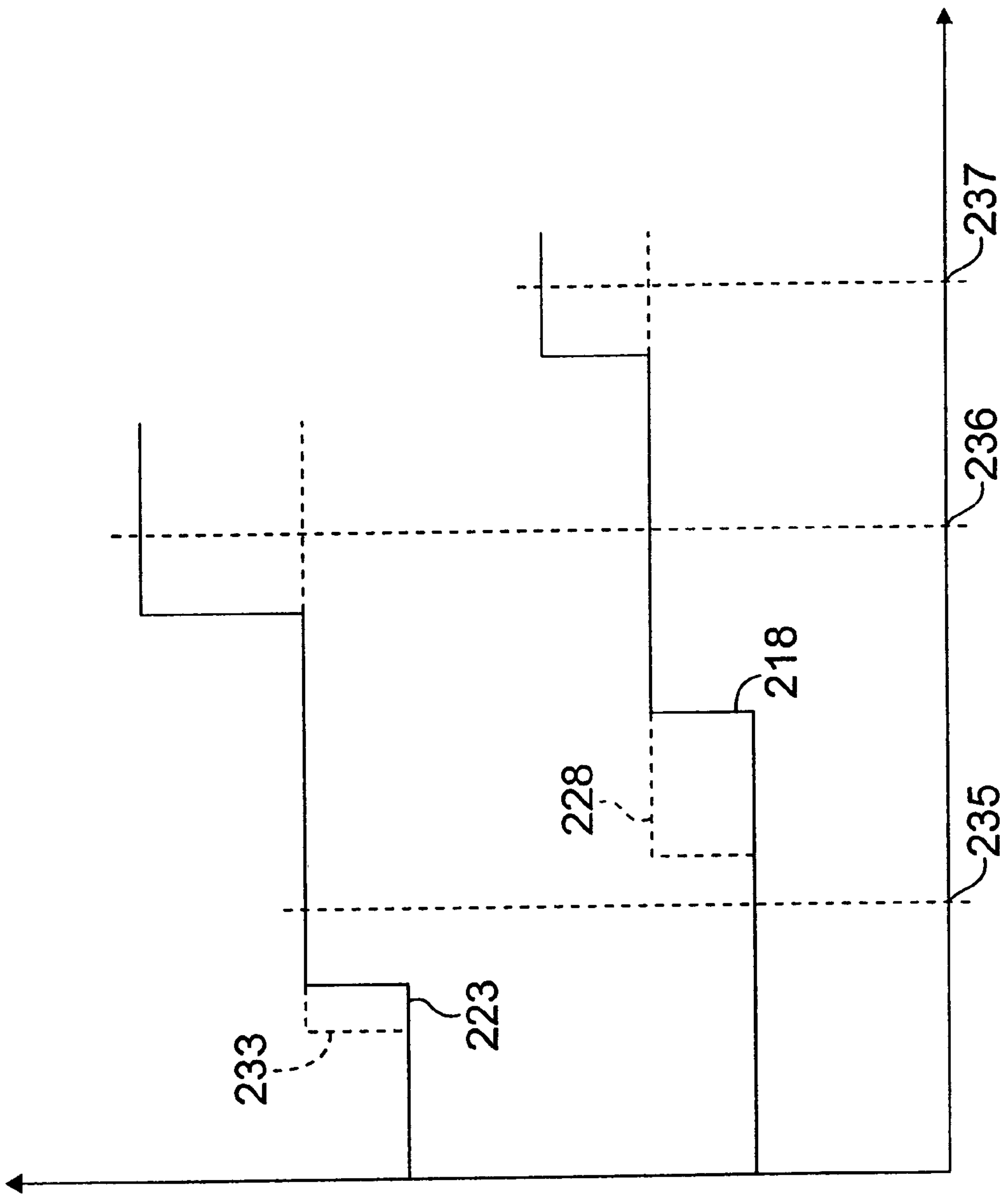
FIG. 11 is a graph which collectively illustrates the manner in which thickness measurements are performed for the envelopes shown in FIGS. 8*a*–8*d*.

FIG. 11 superimposes the thickness distribution curves 218, 223, 228, 233 on a single graph, for comparison purposes. To be noted is that with only a single sorting procedure, and an appropriate selection of indexing points, folded documents contained in an envelope can be readily identified at a processing rate which is substantially accelerated from the processing rates which were previously necessary to identify such characteristics responsive to analyses of the characteristic curves 217, 222, 227, 232 in the time domain. This is because all that is required to identify all characteristic features associated with a given envelope is to carry out a single sorting procedure followed by simple arithmetic operations (subtractions). For example, in the illustrative embodiment of FIG. 11, it is seen that the selection of only three indexing points 235, 236, 237 can be used to segregate information sufficient to identify folded checks contained by either of the two envelope sizes which are illustrated (by performing appropriate subtractions). This is to be distinguished from the plural processing procedures which were formerly required to accomplish such a result. In accordance with the present invention, by varying the number and location of the indexing points which are to be monitored (which can be empirically determined and freely varied), various different imperfections (articles) within an envelope can be simultaneously detected and distinguished in reliable fashion.

What is claimed is:

1. A method for sorting envelopes having an upper and lower surface and contents within the envelopes, comprising the steps of:

a. measuring the distance between the upper and lower surfaces of an envelope at a series of points along the length of the envelope to create a set of thickness points;

b. sorting the thickness points according to magnitude to create an ordered series;

c. selecting two thickness points from the ordered series;

d. determining the difference in magnitude between the selected thickness points;

e. sorting the envelope in response to the difference in magnitude between the selected thickness points.

2. A method for detecting documents in unopened envelopes comprising the steps of:

a. conveying envelopes having contents within the envelopes along a selected path of movement;

b. magnetizing the contents of the envelopes along the selected path of movement;

c. conveying the envelopes past a plurality of read heads along the selected path of movement and reading the flux variations within an upper area of an envelope and a vertically spaced apart lower area and reading the flux variations in an area of the envelope intermediate the upper and lower areas;

d. determining the presence of a first document within the envelope based upon the flux variations in the upper and lower areas;

e. determining the presence of a second document within the enveloped based upon the flux variations in the intermediate area; and f. sorting the envelopes in response to the determination of the presence of the first and second documents.

3. The method of claim 2 comprising the step of determining the presence of a MICR line in the upper or lower area.

4. The method of claim 2 comprising the step of determining the presence of a bar code in the intermediate area.

5. A method for processing envelopes having contents, comprising the steps of:

a. conveying an envelope having contents within the envelope along a select path of movement;

b. scanning the envelope to determine the presence of a first characteristic and a second characteristic;

c. determining the presence of a first document in the envelope in response to the presence of the first characteristic;

d. determining the presence of a second document in the envelope in response to the presence of the second characteristic.

6. The method of claim 5 comprising the step of sorting the envelope in response to the determination of the presence of the first and second documents.

7. The method of claim 5 wherein the step of scanning the envelope comprises the steps of imparting a magnetic charge to the envelope and reading the flux variations as the envelope is conveyed along the selected path of movement.

8. The method of claim 5 wherein the step of scanning includes scanning first and second areas to determine the presence of the first characteristic.

9. The method of claim 8 wherein the step of scanning includes scanning a third area to determine the presence of the second characteristic.

10. The method of claim 9 wherein the first and second areas are vertically spaced apart and the third area is located intermediate the first and second areas.

11. A method for processing envelopes having contents, comprising the steps of:

a. conveying an envelope having contents within the envelope along a select path of movement;

b. measuring the thickness of the envelope and the enclosed content at series of points along the length of the envelope to create a set of thickness points;

c. sorting the thickness points according to magnitude to create an ordered series;

d. selecting two or more thickness points from the ordered series;

e. determining the difference in magnitude between two of the selected thickness points; and f. determining a characteristic of the contents of the envelope based on the difference between the selected thickness points.

12. The method of claim 11 comprising the step of sorting the envelope in response to the difference in magnitude between the selected thickness points.

13. The method of claim 12 wherein the ordered series of thickness points is sorted in ascending order according to magnitude.

14. The method of claim 12 wherein the ordered series of thickness points is sorted in descending order according to magnitude.

15. The method of claim 11 wherein the selected thickness points are nonsequential in the ordered series.

16. The method of claim 11 comprising the step of selecting a third thickness point from the ordered series and comparing the magnitude of the selected thickness points to determine whether the contents include a folded document.

17. A method for processing envelopes having contents within the envelopes, comprising the steps of:

a. conveying an envelope having contents along a selected path of movement;

b. examining the envelope along the selected path of movement to detect contents having a first characteristic indicative of a magnetic stripe;

c. examining the envelope to detect a second characteristic;

d. distinguishing contents having a magnetic stripe from contents having a metallic fastener in response to the detection of the first and second characteristics; and e. directing envelopes having contents that include a magnetic stripe along an alternate path of movement.

18. The method of claim 17 wherein the first characteristic is the distance between the upper surface and the lower surface of the envelope.

19. The method of claim 17 wherein the step of examining the envelope to detect a second characteristic comprises the steps of imparting a magnetic charge to the contents of the envelope and reading the flux variations of the contents of the envelope.

* * * * *

UNITED STATES PATENT AND TRADEMARK OFFICE
CERTIFICATE OF CORRECTION

PATENT NO. : 6,445,808 B1
DATED : April 17, 2003
INVENTOR(S) : Lile et al.

It is certified that error appears in the above-identified patent and that said Letters Patent is hereby corrected as shown below:

Column 4,
Line 64, "signal. 9, 10" should read -- signals 9, 10 --;

Column 5,
Line 49, "fixture. 16" should read -- fixture 16 --;

Column 6,
Line 23, "clip similarly," should read -- clip. Similarly, --;

Column 7,
Line 57, "ill" should read -- 111 --;

Signed and Sealed this

Twenty-ninth Day of July, 2003

JAMES E. ROGAN
*Director of the United States Patent and Trademark Office*